United States Patent [19]
Hershey et al.

[11] Patent Number: 5,579,013
[45] Date of Patent: Nov. 26, 1996

[54] MOBILE TRACKING UNIT CAPABLE OF DETECTING DEFECTIVE CONDITIONS IN RAILWAY VEHICLE WHEELS AND RAILTRACKS

[75] Inventors: John E. Hershey, Ballston Lake; Kenneth B. Welles, II, Scotia, both of N.Y.

[73] Assignee: General Electric Company, Schenectady, N.Y.

[21] Appl. No.: 238,772

[22] Filed: May 5, 1994

[51] Int. Cl.$^6$ .............................. H04B 7/185; G01S 5/02
[52] U.S. Cl. .......................................... 342/357; 342/457
[58] Field of Search .................................. 342/357, 457; 246/122 R, 168.1, 169 R, 369; 73/8

[56] References Cited

U.S. PATENT DOCUMENTS

| | | | |
|---|---|---|---|
| 5,129,605 | 7/1992 | Burns et al. | 246/5 |
| 5,223,844 | 6/1993 | Mansell et al. | 342/357 |
| 5,225,842 | 7/1993 | Brown et al. | 342/357 |
| 5,247,338 | 9/1993 | Danneskiold-Samsoe et al. | 356/1 |
| 5,341,683 | 8/1994 | Searle | 73/597 |
| 5,433,111 | 7/1995 | Hershey et al. | 364/443 |
| 5,475,597 | 12/1995 | Buck | 364/443 |
| 5,491,486 | 2/1996 | Welles, II et al. | 342/357 |
| 5,493,449 | 2/1996 | Theurer et al. | 364/449 |

OTHER PUBLICATIONS

"Swords into Plowshares" A Smart Approach to Freight Damage Prevention, GPS System, Communications Satellites, & New Accelerometer Technology, Help Railroads Improve Service, Tim Slifkin, Elexor Assoc. Inc. pp. 1–5.

*Primary Examiner*—Theodore M. Blum
*Attorney, Agent, or Firm*—Marvin Snyder

[57] ABSTRACT

A mobile tracking unit capable of detecting defective conditions associated with a set of railway vehicle wheels and with a railtrack upon which a given railway vehicle travels comprises a rotation measurement unit for generating data indicative of rotational rate of the set of wheels; a motion sensor, such as an accelerometer or vibration sensor, for generating data indicative of motion along a vertical axis relative to the railtrack; a data processor coupled to the motion sensor and to the rotation measurement unit for receiving the rotational rate and motion data; a navigation set for generating data corresponding to a respective railway vehicle position thereby allowing for determination of the location at which any respective defective condition occurs; and a transmitter for transmitting predetermined data associated with the railway vehicle to a remote location where the transmitted data can be processed. The data processor is designed for detecting, based on the received rotational rate and motion data, the defective condition associated with the wheel set and for detecting, based on the received motion data, the defective condition associated with the railtrack.

17 Claims, 6 Drawing Sheets

ABSTRACT# MOBILE TRACKING UNIT CAPABLE OF DETECTING DEFECTIVE CONDITIONS IN RAILWAY VEHICLE WHEELS AND RAILTRACKS

RELATED APPLICATION

This application is related to patent application Ser. No. 245,711, now U.S. Pat. No. 5,433,111 entitled "Apparatus and Method for Detecting Defective Conditions in Railway Vehicle Wheels and Railtracks," filed concurrently with the present application, assigned to the assignee of the present invention and herein incorporated by reference.

BACKGROUND OF THE INVENTION

The present invention relates to a mobile tracking unit capable of detecting defective conditions in railway vehicle wheels and railtracks and, more particularly, to a mobile tracking unit employing a motion sensor for sensing such defective conditions.

Wear on the treads of railway vehicle wheels is a well-known phenomenon which can cause any given wheel to have a pronounced flat section. A defective railway vehicle wheel condition, as characterized by a wheel having such flat section, is referred herein as a "flat wheel" condition. The occurrence in a rail or train vehicle of such "flat wheel" condition or defect is undesirable due to potential for cargo damage as well as increased operating costs and reduced safety while the railway vehicle is travelling. Wear on bearings which support the railway vehicle wheels can induce similar undesirable results. It is desirable to provide a technique which allows for determining the presence of such defects in a manner which uses relatively few components so as to enhance operational reliability and minimize electrical power consumption and weight requirements. Further, it is desirable to provide a technique which allows for detecting defective conditions associated with the railtrack upon which a given railway vehicle travels. This information is particularly useful to those responsible for maintaining the railtracks of the nation in good operating condition. In addition, it is desirable to provide a mobile tracking unit which is capable of implementing the foregoing techniques and which can readily provide the location of the railway vehicle. Typically, the mobile tracking unit includes a navigation set, such as a Global Positioning System (GPS) receiver or other suitable navigation set, responsive to navigation signals transmitted by a set of navigation stations which can be either space- or earth-based. In each case, the navigation set is capable of providing data indicative of the vehicle location based on the navigation signals. The mobile tracking unit can include a suitable electromagnetic emitter for transmitting the vehicle position data and other data acquired with sensing elements in the vehicle to a remote location. It will be appreciated that the mobile tracking unit advantageously allows for determining the location at which any particular defect occurs.

SUMMARY OF THE INVENTION

Generally speaking, the present invention fulfills the foregoing needs by providing a mobile tracking unit having the capability of detecting defective conditions associated with a set of railway vehicle wheels and with a railtrack upon which a given railway vehicle travels. The mobile tracking unit comprises a rotation measurement unit for generating data indicative of rotational rate of the set of wheels; a motion sensor, such as an accelerometer or vibration sensor, for generating data indicative of motion at least along a generally vertical axis relative to the railtrack; a data processor coupled to the motion sensor and to the rotation measurement unit for receiving the rotational rate and motion data; a navigation set for generating data corresponding to a respective railway vehicle position thereby allowing for determination of the location at which any respective defective condition occurs; and a transmitter or emitter for transmitting predetermined data associated with the railway vehicle to a remote location where the transmitted data can be processed. The data processor is conveniently designed for detecting, based on the received rotational rate and motion data, a defective condition associated with at least one wheel of the wheel set. The data processor is further designed for detecting, based on the received motion data, a defective condition associated with at least a portion of the railtrack.

A method for detecting defective conditions associated with a set of railway vehicle wheels and with a railtrack upon which a given railway vehicle travels comprises the steps of generating data indicative of rotational rate of the set of wheels; generating data indicative of motion at least along a generally vertical axis relative to the railtrack; processing the rotational rate and motion data for detection of a defective condition associated with at least one wheel of the wheel set; and processing the motion data for detection of a defective condition associated with at least a portion of the railtrack. The additional step of generating data substantially corresponding to a respective railway vehicle position conveniently allows for substantially determining the location at which any respective defective condition occurs.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawings in which like numbers represent like pans throughout the drawings, and in which:

DETAILED DESCRIPTION OF THE INVENTION

The present invention provides a mobile tracking unit capable of detecting respective defective conditions associated with a set of railway vehicle wheels, such as a "flat wheel" and/or damaged beating condition, and with a railtrack upon which a given railway vehicle travels. The mobile tracking unit is readily capable of operating in a power-starved environment, as described in U.S. application Ser. No. 233,091 filed Apr. 25, 1994, now U.S. Pat. No. 5,491,486, issued Feb. 13, 1996, assigned to the assignee of the present application and herein incorporated by reference. The mobile tracking units can be conveniently employed for a vehicle tracking or monitoring system which at least provides vehicle location information using navigation data derived from an existing navigation system, such as the Global Positioning System (GPS) satellite constellation, thereby providing highly accurate, real-time, vehicle tracking capability. It will be appreciated that such tracking units are not limited to GPS navigation, being that vehicle tracking systems that use other navigation systems such as Loran, Omega, Transit and the like, or even satellite range measurement techniques (as respectively described in U.S. Pat. No. 4,161,730 and U.S. Pat. No. 4,161,734, both by R. E. Anderson, issued Jul. 17, 1979, both assigned to the present assignee and herein incorporated by reference) can advantageously benefit from the use of a mobile tracking unit that employs an apparatus for detecting defective conditions associated with a set of railway vehicle wheels and with a railtrack upon which a given railway vehicle travels. The tracking system is particularly useful in fleet vehicle management, railcar tracking, cargo location and the like. For the purposes of this invention the term "vehicle" includes onboard shipping containers and other such means of carrying or transporting goods onboard a train or rail vehicle.

Figure 1:
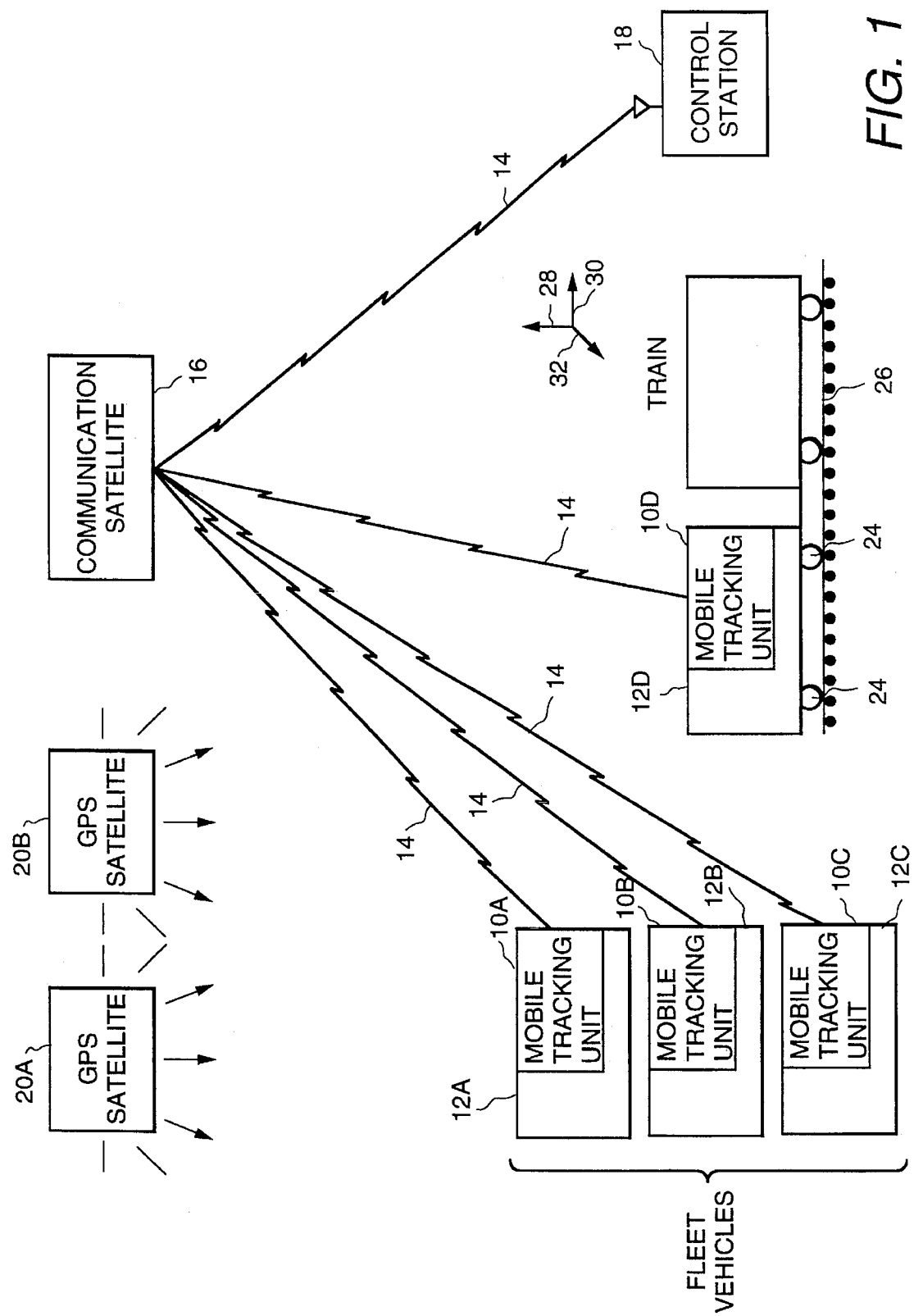
FIG. 1 is a block diagram of an exemplary vehicle tracking system which can employ a mobile tracking unit capable of detecting defective conditions in accordance with the present invention.

FIG. 1 shows, by way of example, mobile tracking units which employ navigation signals from a GPS satellite constellation, although as suggested above, other navigation systems can be used in lieu of GPS. FIG. 1 shows a set of mobile tracking units 10A–10D which are installed in respective vehicles 12A–12D which are to be tracked or monitored. A multiple communication link 14, such as a satellite communication link using a communication satellite 16, can be provided between each mobile tracking unit (hereinafter collectively designated as 10) and a remote control station 18 manned by one or more operators and having suitable processing equipment and display devices and the like for displaying location and status information for each vehicle equipped with a respective mobile tracking unit. A constellation of GPS satellites, such as GPS satellites 20A and 20B, provides highly accurate navigation signals which can be used to determine vehicle position and velocity when acquired by a suitable GPS receiver. Briefly, the GPS was developed by the U.S. Department of Defense and gradually placed into service throughout the 1980's. The GPS satellites constantly transmit radio signals in L-Band frequency using spread spectrum frequency techniques. The transmitted radio signals carry pseudo-random sequences which allow users to determine location relative to the surface of the earth (within approximately 100 ft), velocity (within about 0.1 MPH), and precise time information. GPS is a particularly attractive navigation system to employ, being that the respective orbits of the GPS satellites are chosen so as to provide substantially world-wide coverage and being that such highly-accurate radio signals are available free of charge to users. Communication link 14 can be conveniently used for transmitting vehicle conditions or events measured with suitable sensing elements, as will be explained shortly hereafter. For instance, in the case of a railcar vehicle having a wheel set 24, it is particularly useful to provide the capability of detecting a "flat wheel" and/or damaged ball beating condition. Similarly, in the case of a railcar vehicle, it is also useful to provide the capability of detecting defects associated with railtrack 26 upon which the railway vehicle travels.

Figure 2:
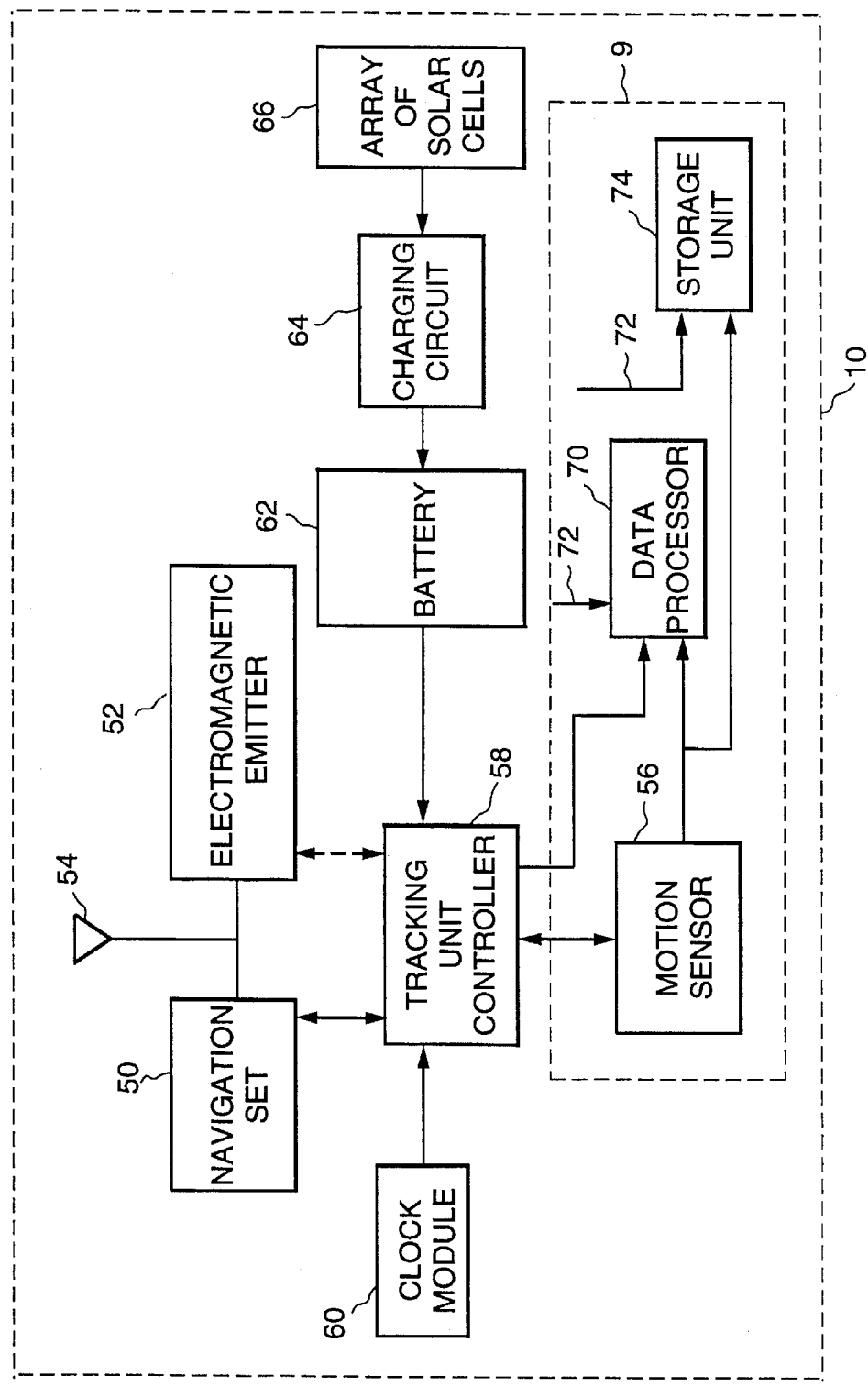
FIG. 2 is a block diagram illustrating further details of the mobile tracking unit including apparatus for detecting defective conditions in accordance with the present invention.

FIG. 2 shows in block diagram form an exemplary embodiment of a mobile tracking unit 10 with an apparatus 9 for detecting respective defective conditions associated with a set of railway vehicle wheels and with the railtrack upon which a given railway vehicle travels. It should be appreciated that although apparatus 9 is shown in FIG. 2 as being operatively combined or integrated with mobile tracking unit 10, such combination or integration is only optional, being that apparatus 9 can easily be designed to function independently from mobile tracking unit 10. The key advantages of the present invention are achieved by employing a motion sensor 56, such as a low power accelerometer, vibration sensor, shock sensor or combination thereof for generating data indicative of motion at least along a generally vertical axis 28 (FIGS. 1 and 3) relative to the railtrack. For the purpose of optionally enhancing versatility of use, a set of three accelerometers or motion sensors individually integrated with suitable signal conditioning circuitry in a respective single monolithic integrated circuit, such as accelerometer model ADXL50 available from Analog Devices, Norwood, Mass., or similar accelerometers and motion sensors, can be conveniently mounted in the vehicle or in the tracking unit to provide triaxial sensing along three mutually orthogonal axes 28, 30 and 32 (FIG. 1) wherein one of the three axes is the generally vertical axis 28. The vertical motion data and horizontal motion data measured with such accelerometer or motion sensor set can be conveniently used for various other purposes, such as for allowing electrical power reduction under predetermined conditions, as described in the aforementioned U.S. Pat. No. 5,491,486. Rotational measurement data 72 indicative of rotational rate ω of the wheel set can be conveniently generated using any one of various rotation measurement techniques. For example, the rotational rate data can be generated with a suitable rotation measurement unit 80 (FIG. 3A), such as a wheel rotation counter, wheel tachometer and similar devices. Alternatively, the wheel rotational rate data can be generated or computed by simply dividing the railcar velocity (available from navigation set 50) by the respective wheel set circumference. In each case, the rotational rate data and the motion sensor data indicative of motion at least along the generally vertical axis is supplied to a data processor 70 or suitably designed circuitry devoted to assessing or detecting the presence of the foregoing respective defective conditions. For example, the "flat wheel" and/or damaged beating condition is detected based on the rotational rate data and motion data being supplied to processor 70. Similarly, the railtrack or railbed defective condition can be determined simply based on the motion data received by data processor 70. As should be apparent to those skilled in the art, the data processing may include a variety of processing techniques such as Fourier analysis, matched filtering, autocorrelation and thresholding techniques and similar processing techniques. Additional processing of the motion sensor data can conveniently provide additional information about the railcar status such as the loading status of the railcar. For example, measuring the frequency of sway motion (i.e., sway or roll motion about the longitudinal axis of the rail vehicle) and the vertical bounce frequency of the railcar can provide substantially accurate information regrading the loading status of the railcar. For example, such information is useful for determining whether the rail vehicle is being loaded beyond its maximum loading capacity.

FIG. 2 also shows that mobile tracking unit 10 includes a navigation set 50 capable of generating data substantially corresponding to the vehicle position. The navigation set is chosen depending on the particular navigation system used for supplying navigation signals to a given mobile tracking unit. Preferably, the navigation set is a GPS receiver such as a multichannel receiver. However, it should be apparent that other receivers designed for acquiring signals from a corresponding navigation system can also be employed. For example, the navigation set, depending on the vehicle position accuracy requirements, can be chosen as a Loran-C receiver or other such less highly-accurate navigation receiver than a GPS receiver. Mobile tracking unit 10 may include a suitable electromagnetic radiation emitter 52 functionally independent from the navigation set. Emitter 52 is capable of at least transmitting the vehicle position data by way of communication link 14 (FIG. 1) to the control station. If a GPS receiver is used, the GPS receiver and the emitter can be conveniently integrated as a single integrated unit for maximizing efficiency of installation and operation. An example of one such integrated unit is the commercially available Galaxy Inmarsat-C/GPS integrated unit available from Trimble Navigation, Sunnyvale, Calif. which is conveniently designed for data communication and position reporting between the control station and the mobile tracking unit. A single, low profile antenna 54 can be conveniently used for both GPS signal acquisition and satellite communication. A tracking unit controller 58 can conveniently provide for controlling operation of the various components in the mobile tracking unit. The tracking unit controller may comprise a conventional multi-bit single chip digital microcontroller suitably programmed to control operation of navigation set 50, emitter 52 and apparatus 9. A real-time clock module 60 can be connected to tracking unit controller 58 so as to periodically enable the controller to resume operation after the controller is in a "sleep-mode" associated with a low power mode of operation. Preferably, tracking unit controller 58 includes sufficient memory and throughput capability to process data acquired from additional sensing elements (not shown) in the vehicle. A power source such as battery 62 is used to enable operation of mobile tracking unit 10. As shown in FIG. 2, battery 62 can be a rechargeable battery, such as a nickel-cadmium battery or a similar rechargeable battery, coupled to a suitable charging circuit 64 which receives electrical power from an array of solar cells 66 or other such electrical power transducer. The charging circuitry typically includes suitable charging regulators and voltage and current sensors (not shown) monitored by the controller for determining the condition of the battery. A backup battery (not shown) can be conveniently provided to enhance reliable operation of the mobile tracking unit. Alternatively, battery 62 can be a nonrechargeable battery replaced at preestablished time intervals. Those skilled in the art will appreciate that the data from the motion sensor and rotation measurement data 72 can be handled in a variety of ways. For example, raw or unprocessed data can be stored in a storage unit 74 to be retrieved and processed at a later time. Conversely, such raw data can be supplied via tracking unit controller 58 to electromagnetic transmitter 52 so that such raw data be processed by a suitable data processor at the remote control station 18 (FIG. 1), thus reducing the weight and electrical power consumption of the mobile tracking unit. In either case, the apparatus of the present invention, singly or in combination with a mobile tracking unit, conveniently provides useful data indicative of respective defective conditions associated with railway vehicle wheels and railtracks. It should be understood that in lieu of a navigation set, such as a GPS or a LORAN receiver, other alternative techniques can be used for determining, for example, the location of a defective railtrack. For example, if the time at which detection of such defective condition occurs is recorded, then simply knowing the schedule of travel (i.e., the travel history of the railway vehicle as a function of time) allows for estimating the location of the railway vehicle when the defective railtrack was detected (i.e., the location of the defective railtrack). Alternatively, a wheel tachometer or similar device can be used to count wheel revolutions under predetermined events. For instance, counting the number of revolutions occurring from detection of a damaged railtrack to a given destination point allows for estimating the distance from the damaged railtrack to such destination point (the distance is computed by multiplying wheel circumference by the wheel rotation count). In this case, by simply knowing the route travelled (and without time information, i.e., travel schedule) allows for determining the location of the defective railtrack. Thus, it should now be apparent that use of a navigation set for determining the location of a defective condition, such as the location of a bad railtrack, is only optional in view of the above-described alternative techniques.

Figure 3A:
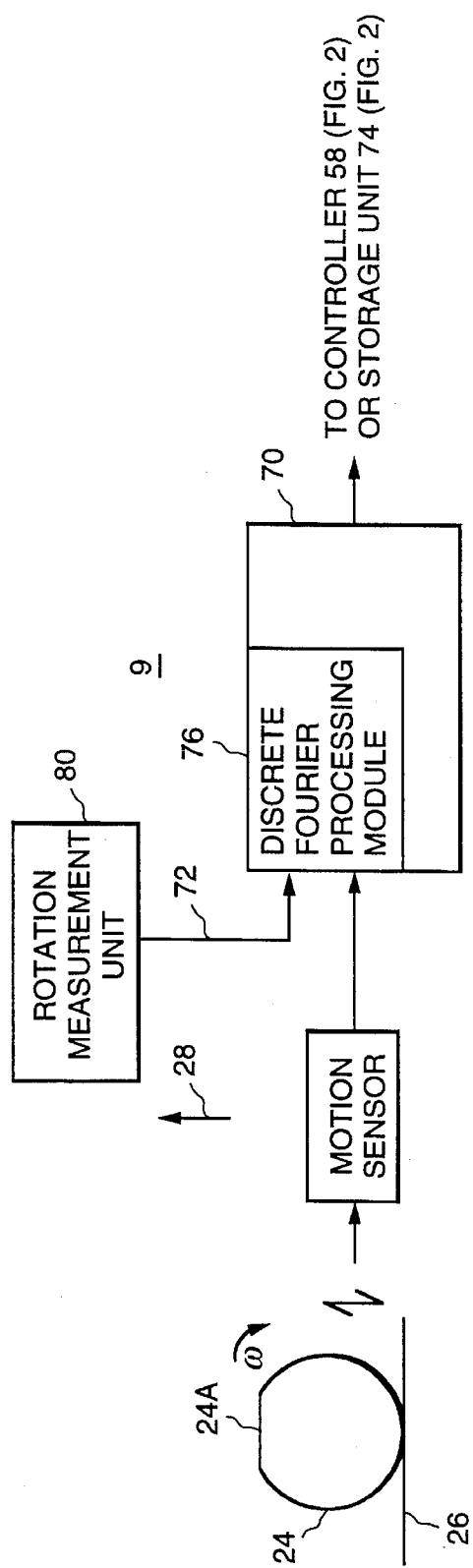
FIGS. 3A and 3B illustrate an exemplary embodiment of the apparatus shown in FIG. 2 being used for detecting a defective condition associated with a railway vehicle wheel and with a railtrack, respectively.

It should be appreciated from FIG. 3A that if the wheel exhibits a defective region such as substantially flat region 24A, then motion sensor 56 will sense mechanical energy in a frequency region substantially corresponding to the wheel rotation frequency (i.e., wheel rotation rate $\omega$) and harmonics thereof as measured in the wheel rotational rate data 72 from rotational measurement unit 80. The data processor can be readily designed to incorporate a digital signal processor module comprising, by way of example and not of limitation, a discrete Fourier processor 76 which processes the wheel rotational rate data 73 and the motion sensor data so as to determine the condition generally referred as "flat wheel" condition which can be associated with at least one wheel of the wheel set. Although FIG. 3A specifically depicts a deformity associated with a "flat wheel" condition, in a more general case, FIG. 3A can be used to conceptualize other deformities such as can develop in the bearings (not shown) which supports a wheel 24 that may not have a flat region. As is generally known by those skilled in the art, a respective wheel set comprises, for example, two wheels which are rotatively coupled to the opposite ends of a rigid axle by suitable bearings having balls or rollers confined between outer and inner races. These bearings typically exhibit predetermined mechanical characteristics as a function of wheel rotation rate, i.e., a generally constant number of balls or rollers passes over the top of the axle for each revolution since the top of the axle is typically the region where the balls or rollers experience maximum loading. It can be shown that when either the outer or inner race (or the balls or rollers) are damaged, then for a given wheel rotation rate, there is generation of respective frequency components or beat frequencies predeterminedly situated above and below the wheel rotation frequency. Processor 70 can readily be designed to detect such frequency components in the same manner that such processor detects the "flat wheel" condition. In each case, discrete Fourier processing module 76 can be integrated in a single integrated circuit chip or in a processing module such as processing module TMS320 available from Texas Instruments.

Figure 3B:
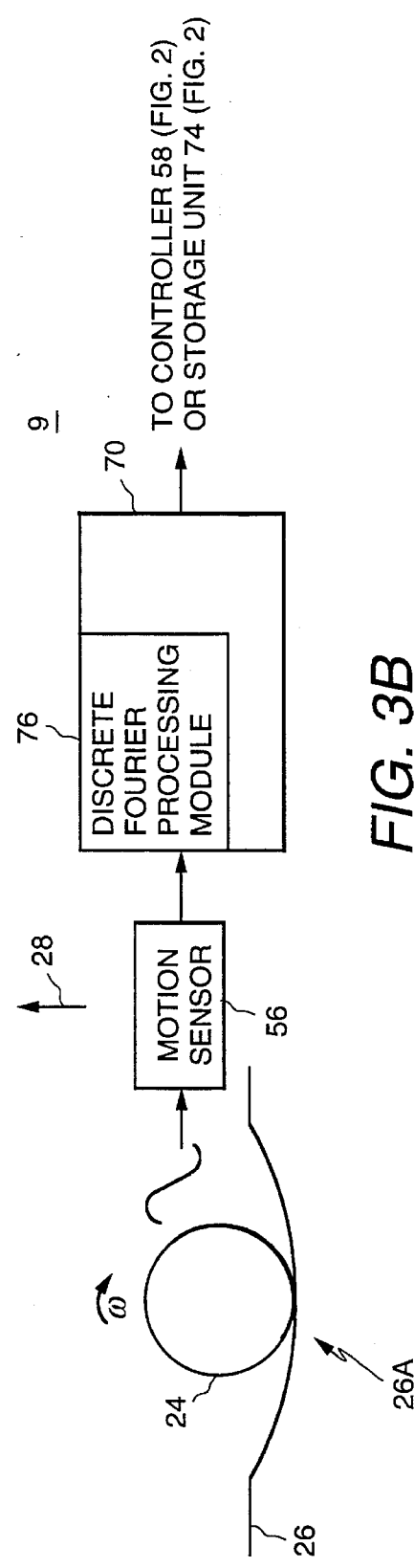

FIG. 3B shows that when the railway vehicle passes over a railtrack 26 that has a portion 26A that substantially sags or drops under the weight of the railway vehicle, then motion sensor 56 will sense mechanical energy having a predetermined signature which characterizes such undesirable railtrack condition. It should be appreciated that the mechanical energy signature corresponding to a given defective track condition is generally independent from the wheel rotation rate and, hence, for the purpose of determining a defective railtrack condition, rotational rate data 72 (FIG. 3A) is not necessary.

Figure 4A:
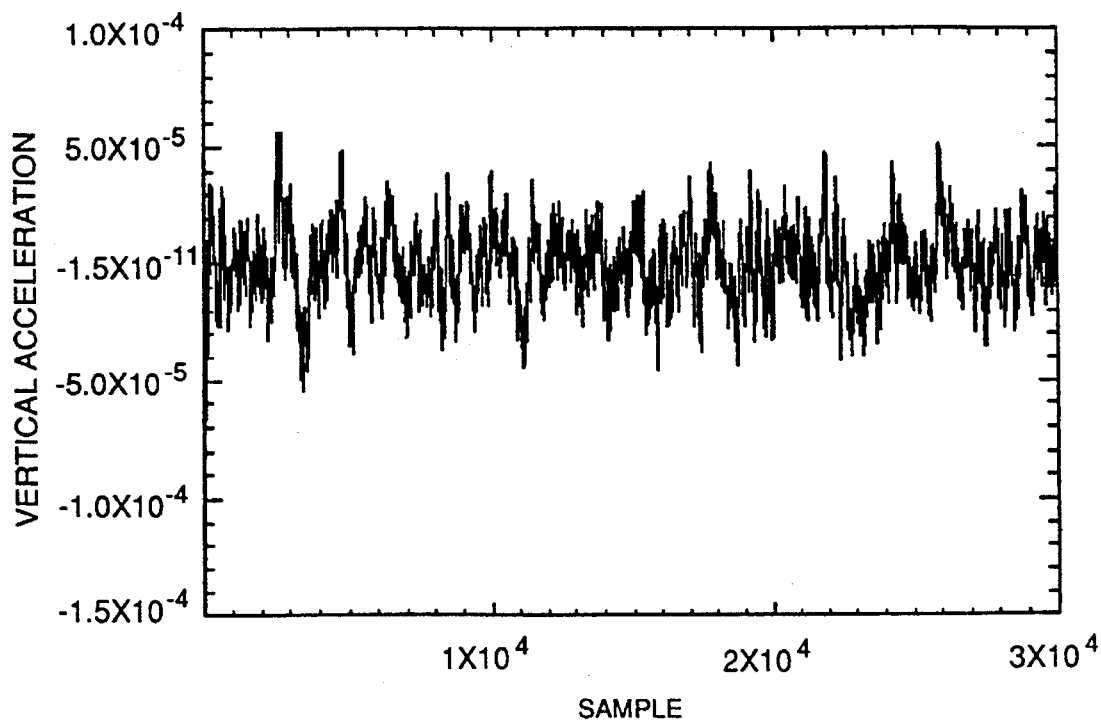
FIGS. 4A and 4B illustrate, respectively, an exemplary accelerometer output signal in the time domain and corresponding power spectral density in the frequency domain under no defective conditions.
Figure 4B:
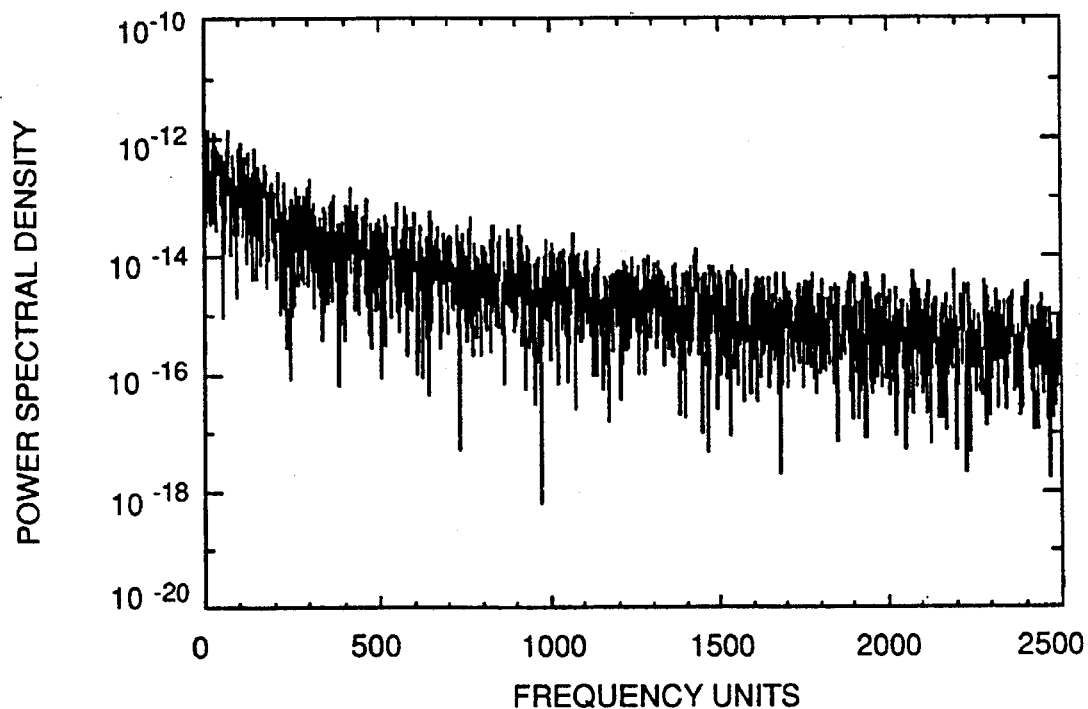

FIG. 4A is an exemplary simulation plot of a typical vertical accelerometer output signal in the time domain in the absence of a defective condition, that is, the railway vehicle wheels and/or bearings are substantially undeformed and the railtrack does not exhibit any significant drop or sag under the weight of the railway vehicle. FIG. 4B is the power spectral density in the frequency domain for the accelerometer output signal corresponding to the condition shown in FIG. 4A.

Figure 5A:
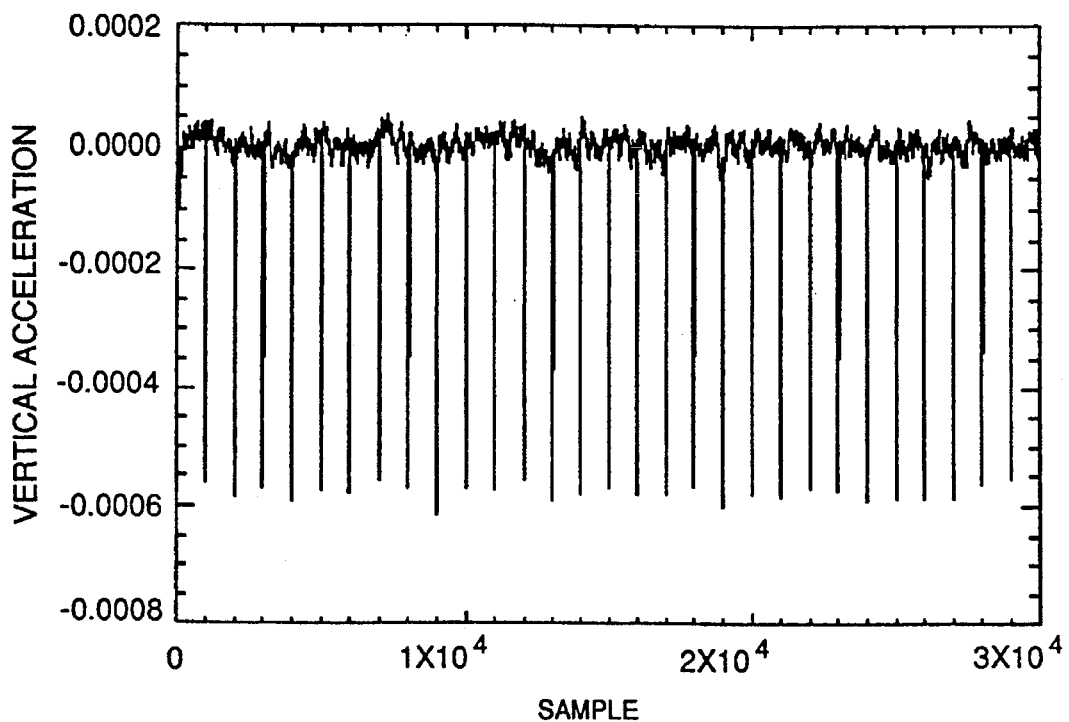
FIGS. 5A and 5B illustrate, respectively, an exemplary accelerometer output signal in the time domain and corresponding power spectral density in the frequency domain under a "flat wheel" defective condition.
Figure 5B:
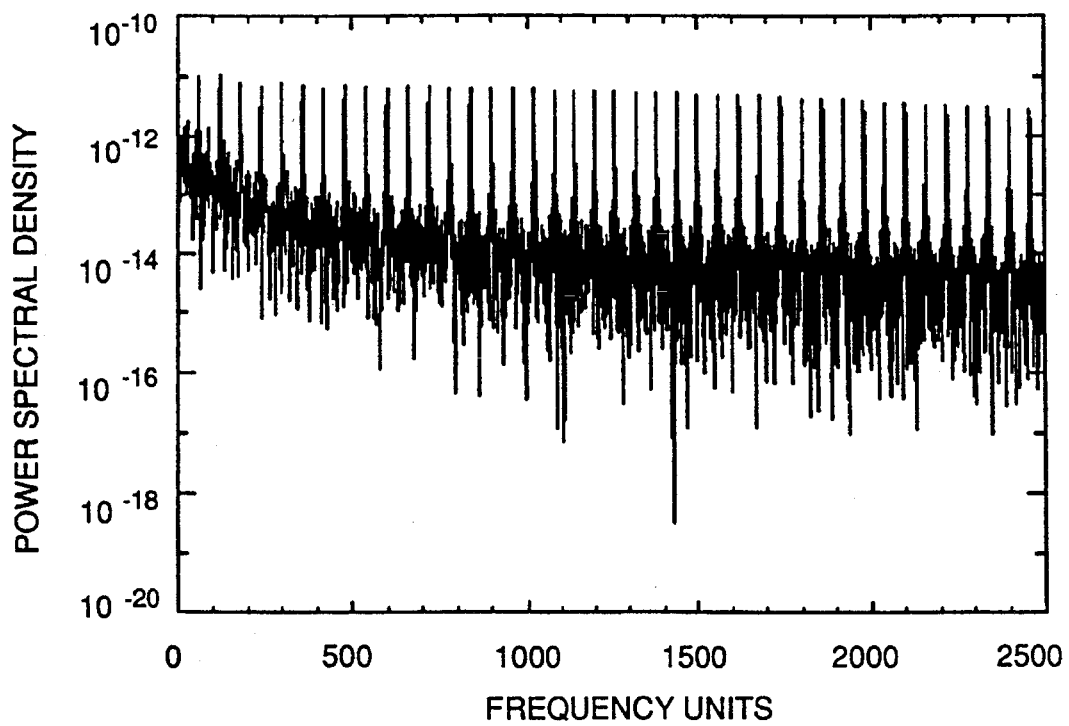

FIG. 5A is an exemplary simulation plot of a typical vertical accelerometer output signal in the time domain when sensing a "flat wheel" condition. Those skilled in the art will appreciate that the periodicity of the impulse-like spikes seen in FIG. 5A directly correspond to the wheel rate rotation ω. FIG. 5B shows the power spectral density in the frequency domain for the accelerometer output signal corresponding to the condition shown in FIG. 5A. It is seen that the periodic impulse-like spikes in the frequency domain reveal the presence of the "flat wheel" condition. This exemplary power spectral density was obtained using a conventional unwindowed Fourier transform processing technique. As previously suggested, other processing techniques in lieu of a Fourier transform can be effectively used to detect the presence of a "flat wheel" condition.

Figure 6A:
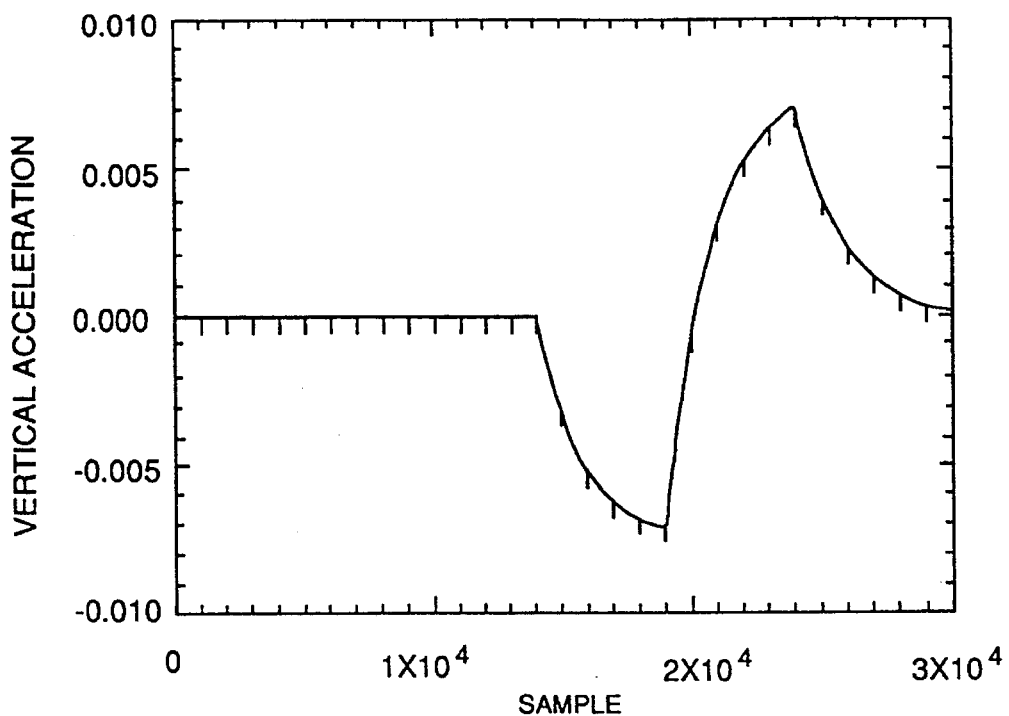
FIGS. 6A and 6B illustrate, respectively, an exemplary accelerometer output signal in the time domain and corresponding power spectral density in the frequency domain under both a "flat wheel" defective condition and a defective railtrack condition.
Figure 6B:
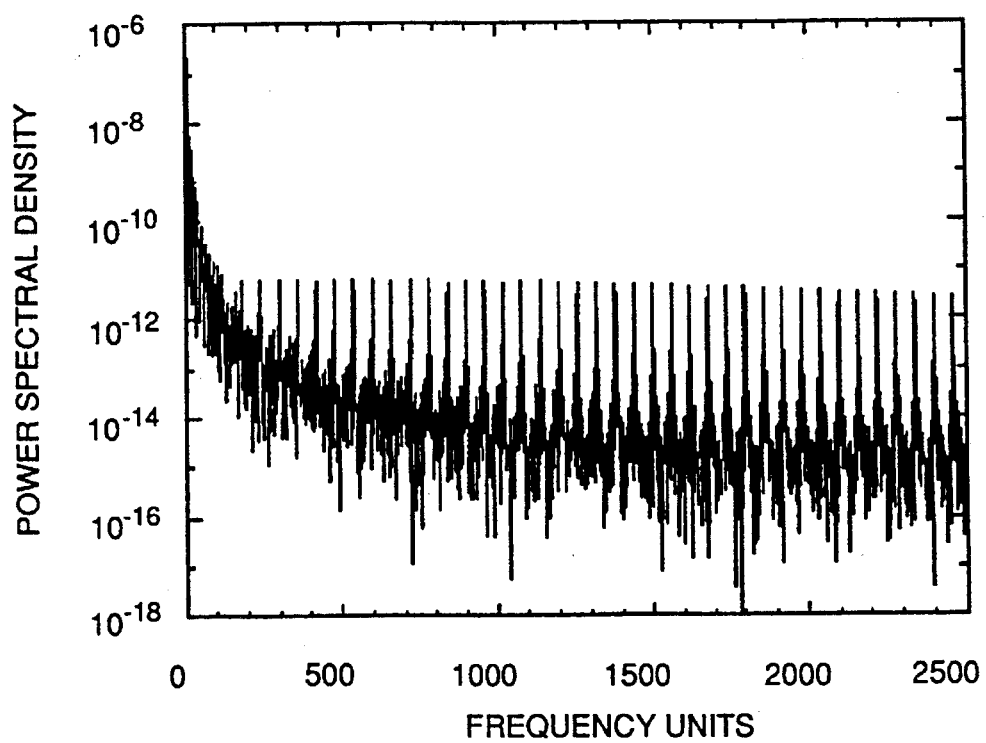

FIG. 6A is an exemplary simulation plot of a typical vertical accelerometer output signal when sensing both a "flat wheel" condition characterized by the impulse-like spikes and a defective railtrack condition characterized by the down-up waveshape. FIG. 6B shows the power spectral density in the frequency domain for the accelerometer output signal shown in FIG. 6A. Again, it is seen that the periodic impulse-like spikes in the frequency domain reveal the presence of the "flat wheel" condition. Further, the railtrack defective condition, i.e., the railtrack sag or drop, is revealed in the frequency domain by the dramatic relative increase in the low frequency components.

A method for detecting defective conditions associated with a set of railway vehicle wheels and with a railtrack upon which a given railway vehicle travels comprises the steps of generating data indicative of rotational rate of the set of wheels; generating data indicative of motion at least along a generally vertical axis relative to the railtrack; processing the rotational rate and motion data for detection of a defective condition associated with at least one wheel of the wheel set; and processing the motion data for detection of a defective condition associated with at least a portion of the railtrack. The additional step of generating data substantially corresponding to a respective railway vehicle position conveniently allows for substantially determining the location at which any respective defective condition occurs. This is especially useful in the case of establishing the location of a defective railtrack portion over a known route. One simple way to determine the location of such defect is counting the number of wheel revolutions upon detection of the defective railtrack portion; and then measuring distance traveled over the known route from a current railway vehicle location (e.g., any destination of the railway vehicle over the known route). The distance traveled over the known route upon detection of the defective railtrack portion is simply calculated by multiplying the wheel revolution count by the wheel set circumference. This conveniently allows for substantially and economically determining the location of the defective railtrack portion over the known route at least with respect to the current railway vehicle location.

While only certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A mobile tracking unit comprising:

a rotation measurement unit for generating data substantially indicative of rotational rate of the set of wheels;

a motion sensor for generating data indicative of motion at least along a generally vertical axis relative to the railtrack;

a data processor coupled to the motion sensor and to the rotation measurement unit for receiving the rotational rate and motion data, said data processor being adapted to detect, based on the received rotational rate and motion data, a defective condition associated with at least one wheel of the wheel set, said data processor being further adapted to detect, based on the received motion data, a defective condition associated with at least a portion of the railtrack;

a navigation set for generating data substantially corresponding to a respective railway vehicle position so that the location at which any respective defective condition occurs can be substantially determined; and an electromagnetic radiation emitter for transmitting predetermined data associated with the railway vehicle to a remote location.

2. The mobile tracking unit of claim 1 wherein said navigation set comprises a GPS receiver.

3. The mobile tracking unit of claim 2 wherein said motion sensor comprises at least one sensor selected from the group of sensors consisting of accelerometers, vibration sensors and shock sensors.

4. The mobile tracking unit of claim 2 wherein said data processor is adapted to be remotely coupled to said motion sensor and said rotation measurement unit so that the predetermined data transmitted by said emitter is processed at the remote location.

5. The mobile tracking unit of claim 4 wherein said data processor comprises a discrete Fourier processor.

6. The mobile tracking unit of claim 1 wherein said data processor comprises a discrete Fourier processor.

7. The mobile tracking unit of claim 1 wherein said motion sensor comprises an accelerometer set positioned to measure acceleration along three mutually orthogonal axes, wherein one of the three mutually orthogonal axes comprises the generally vertical axis relative to the railtrack.

8. The mobile tracking unit of claim 7 wherein the data processor is adapted to process the data from the accelerometer set so as to determine loading status of the railway vehicle.

9. The mobile tracking unit of claim 1 wherein said rotation measurement unit is adapted to generate the rotational rate data based upon railway vehicle velocity and wheel circumference.

10. A method for detecting defective conditions associated with a set of railway vehicle wheels and with a railtrack upon which a given railway vehicle travels, comprising:

generating data indicative of rotational rate of the set of wheels;

generating data indicative of motion at least along a generally vertical axis relative to the railtrack;

processing the rotational rate and motion data for detection of a defective condition associated with at least one wheel of the wheel set; and generating data substantially corresponding to a respective railway vehicle position so that the location at which any respective defective condition occurs can be substantially determined.

11. The method of claim 10 further comprising the step of processing the motion data for detection of a defective condition associated with at least a portion of the railtrack.

12. The method of claim 11 further comprising the step of transmitting predetermined data associated with the railway vehicle to a remote location.

13. The method of claim 12 wherein said predetermined data comprises unprocessed data so that the transmitted data can be processed at the remote location.

14. The method of claim 11 further comprising the step of processing data from an accelerometer set having three mutually orthogonal axes for determining loading status of the vehicle, wherein one of the three mutually orthogonal axes is the generally vertical axis relative to the rail track.

15. The method of claim 10 wherein the step of generating data for substantially determining the location of the defective railtrack portion as the railway vehicle travels over a known route, comprises:

counting the number of wheel revolutions upon detection of the defective railtrack portion; and measuring distance traveled over the known route, based upon the wheel revolution count, from a current railway vehicle location, thereby substantially determining the location of the defective railtrack portion over the known route at least with respect to the current location of said railway vehicle.

16. The method of claim 10 wherein the detected defective condition associated with the set of railway vehicle wheels comprises a "flat wheel" condition.

17. The method of claim 10 wherein the detected defective condition associated with the set of railway vehicle wheels comprises a defective bearing condition.

* * * * *